United States Patent [19]
Bauer et al.

[11] Patent Number: 4,796,871

[45] Date of Patent: Jan. 10, 1989

[54] GAS SPRING WITH END POSITION DAMPING

[75] Inventors: Hans-Peter Bauer; Hans J. Bauer; Ludwig Stadelmann; Emil Frisch, all of Altdorf, Fed. Rep. of Germany

[73] Assignee: Fritz Bauer & Söhne oHG, Altdorf, Fed. Rep. of Germany

[21] Appl. No.: 61,826

[22] Filed: Jun. 10, 1987

[30] Foreign Application Priority Data

Jul. 15, 1986 [DE] Fed. Rep. of Germany ....... 3623787

[51] Int. Cl.$^4$ .............................. F16F 5/00; F16F 9/49
[52] U.S. Cl. ................................. 267/64.11; 188/282; 188/317; 267/34; 267/70; 267/126
[58] Field of Search .................. 267/64.11, 70, 71, 34, 267/120, 126, 127; 188/284, 282, 317, 316, 322.15

[56] References Cited

U.S. PATENT DOCUMENTS 4,230,309  10/1980  Schnitzius .......................... 188/284

FOREIGN PATENT DOCUMENTS 1430494  4/1970  Fed. Rep. of Germany ...... 188/284
2414457  9/1983  Fed. Rep. of Germany .

*Primary Examiner*—Andres Kashnikow
*Assistant Examiner*—Mark Le
*Attorney, Agent, or Firm*—Browdy and Neimark

[57] ABSTRACT

A gas spring with end positions damping has a cylindrical housing filled with a fluid under pressure, in which a piston rod, sealingly extending from one end of the housing, is disposed to be coaxially slideable and on the inner end of which a piston is attached. To create an end position damping that is simple in structure, and which can be used purely pneumatic, purely hydraulic or hydropneumatic, an auxiliary piston in the form of a throttle piston is slidingly disposed on the piston rod, which is supported via an energy accumulator towards the end of the housing where the piston rod exits. The piston abuts against this auxiliary piston at the end of the extension movement of the piston rod. Its throttle effect is larger during movement in the direction toward the end where the piston rod exits than in the opposite direction.

17 Claims, 2 Drawing Sheets

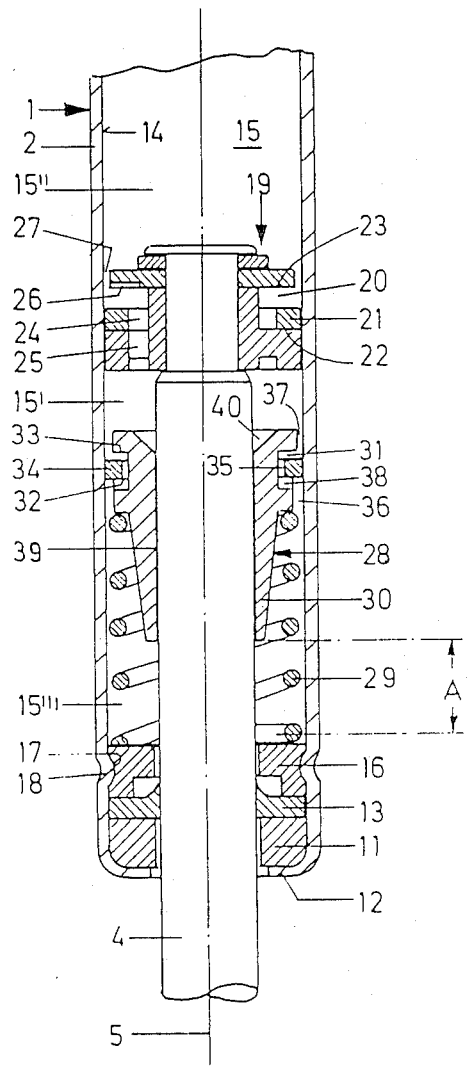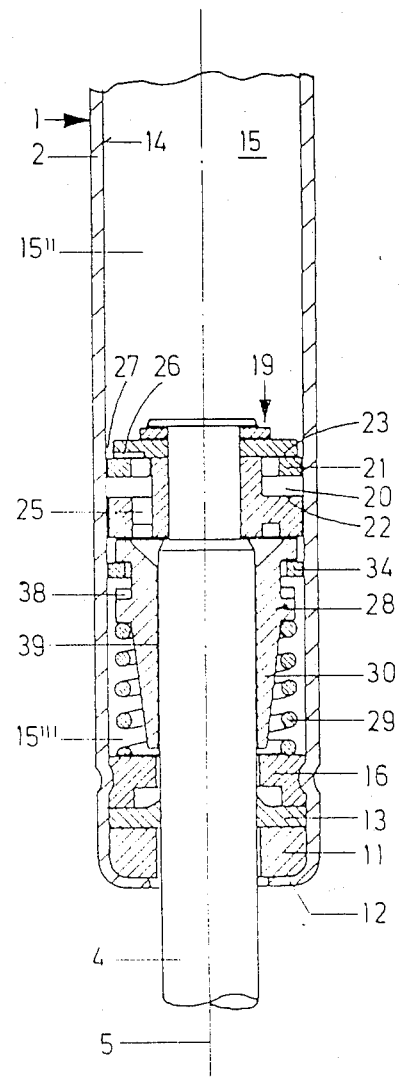

GAS SPRING WITH END POSITION DAMPING

The invention relates to a gas spring with end position damping, wherein a piston rod is coaxially slidingly disposed in a housing to sealingly extend from one end of the housing, a piston (damping piston) is fastened on an inner end of the piston rod, and a device is provided at the end where the piston rod exits for the damping of an extension movement of the piston rod at the end of its extension move.

BACKGROUND OF THE INVENTION

In such a gas spring the piston located at the free end of the piston rod is formed as a damping piston which tightly seals when the piston rod is extended from the housing. The gas flows via a duct formed in the piston rod and bridging the piston from one side of the piston to the other, and this duct is connected by means of a throttle bore with the associated inner chamber of the gas spring. The duct is formed in the piston rod of such a length, and the throttle bore is disposed at such a distance from the piston, that prior to reaching the end position of the piston rod and piston the throttle bore enters a bore disposed on the end of the gas spring where the piston rod exits, having an only slightly greater diameter than the piston rod, so that the gas can only flow through the throttle bore and the duct under additional spring throttling. Especially in the case where the gas spring is filled exclusively with gas, or where possibly oil is no longer present where needed in the end of the housing where the piston rod exits when the gas spring is in the largely extended position, the throttle bore has to be very small. Such a small throttle bore, however, is relatively easily plugged up if small particles are for example rubbed off the seals. Bores as small for instance as 0.4 mm diameter, which for technical reasons are about the smallest practical diameter, do not provide satisfactory damping.

Such gas springs are particularly used as a lifting aid for hatchbacks or hoods of automotive vehicles, and often the outer free end of the piston rod points downwardly in the closed position of the hatch or hood, whereas in the opened position it points upwardly. If oil is used in such gas springs for stop damping during the extension of the piston rod, then this oil is, at least after a first extension of the piston rod, on the wrong side of the piston fastened to the piston rod, and therefore it is not in a position to satisfactory effect the end position damping. To remove these problems it is known from German Pat. No. 24 14 457 to attach a cup-like container to the piston rod in the area of its piston attached on its inner end, which is open in the direction towards the exit of the piston rod. A liquid-level displacement float is associated with this container and is attached at the end of the housing where the piston rod exits. The outer diameter of the container is smaller by an insignificant amount than the inner diameter of the housing. If the end of the housing where the piston rod exits attains an upwardly directed position when the hatchback is swivelled upwardly, the damping fluid present generally flows into the container and is carried along by it, until the liquid-level displacement float dips into the container and pushes the damping fluid out. This then is forced out through the gap between the container and the inner wall of the housing, to provide a corresponding damping. This structural solution is very complicated. In most actually occurring cases, the gas springs are installed as lifting aids for hatchbacks or hoods, such that in the closed position of the hatches the outer free ends of the piston rods point upwards, and in the opened position of the hatch they point downward. In this case the oil contained in the gas spring cannot be practically used for end damping when the piston rod is extended, unless special steps are taken.

SUMMARY OF THE INVENTION

It is an object of the invention to provide an end position damping that is simple in construction, and which can be purely pneumatic, purely hydraulic as well as hydro-pneumatic.

By means of the invention it is achieved that at the end of the extension movement of the piston rod, when the piston attached to the piston rod has reached the auxiliary piston, a damping force opposite to the extension movement of the piston rod is exerted on the latter. This is composed of a force provided by an energy accumulator which is directed oppositely to the force exerted by the gas pressure, and by the damping force, dependent on the extension speed, which is exerted by the flow of the fluid formed by the gas and/or damping fluid through the throttle duct.

By means of the present invention it is achieved that the end position damping accomplished by the fluid can be exactly designed, and an exact calibration of the throttle duct can be provided. The present invention further makes it possible that, when the end position damping becomes effective when the piston rod is completely extended, only the damping effect in the throttle duct is effective, the retraction movement of the piston rod being no longer damped by the auxiliary piston.

Further details of the invention can be seen from the following description of an exemplary embodiment by means of the drawings.

BRIEF DESCRIPTION OF THE DRAWINGS

FIG. 2 is a partial longitudinal section of a gas spring in accordance with the invention, wherein the damping piston and the auxiliary piston are being in a position corresponding to the retraction movement of the piston rod.

FIG. 3 is a partial longitudinal section of a gas spring in accordance with the invention, in which under adherence of the damping piston on the auxiliary piston an end position damping is generated during an extension movement of the piston rod.

DETAILED DESCRIPTION OF THE PREFERRED EMBODIMENTS

Figure 1:
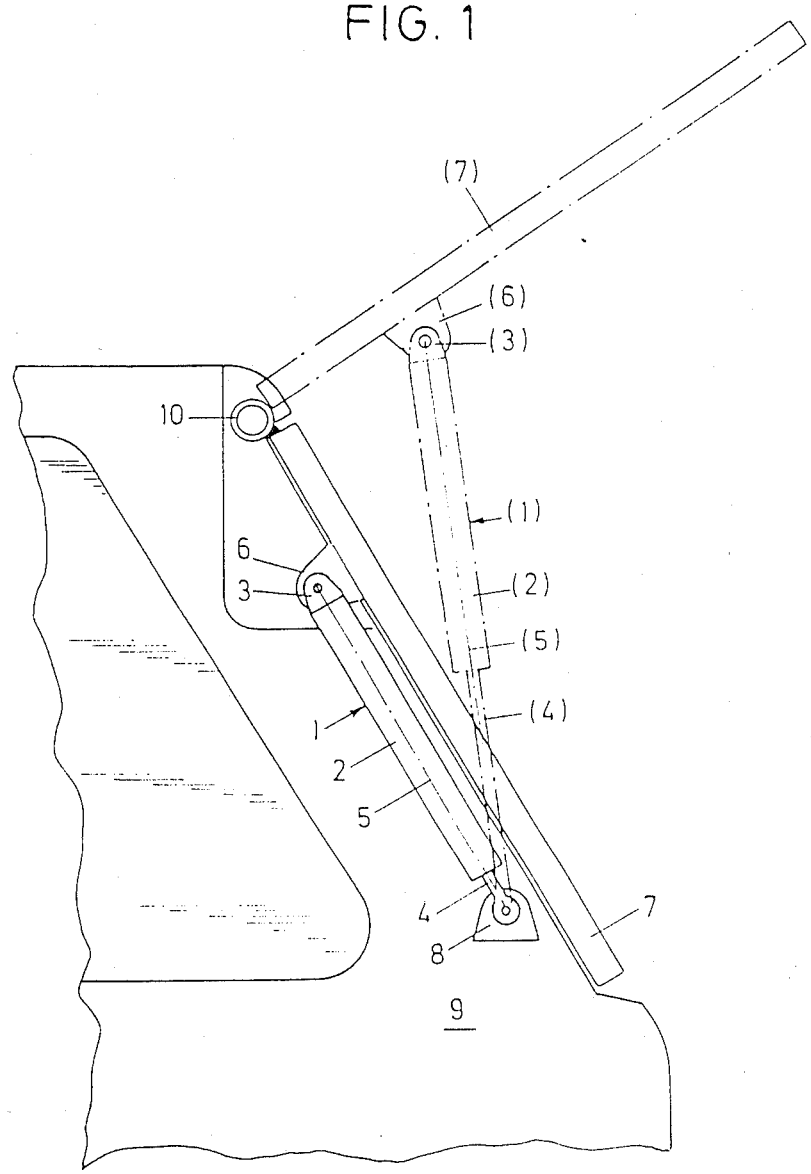
FIG. 1 is a schematic view of a gas spring according to the invention mounted on a hatchback of an automotive vehicle.

As shown in FIG. 1, a gas spring 1 has an approximately cylindrical housing 2, on the one gas-tight closed end of which a swivel eye 3 has been attached. A piston rod 4 extends from the lower end of the housing 2 and is slideably and concentrically disposed with respect to the longitudinal center axis 5 of the housing 2. The gas spring 1 is pivoted with its swivel eye 3 on a hinge 6 on the hatchback 7 of an automotive vehicle.

The free end of the piston rod 4 is pivoted on the frame 9 of the automatic vehicle by means of a hinge 8. The hatchback 7 is attached by means of a hinge 10 to the frame 9. The hinge 10 is located above the hinge 6 in the closed position of the hatchback 7, and above the hinge 8.

As can be seen from FIG. 1, the piston rod 4 is retracted into the housing 2 when the hatchback 7 is closed. When the hatchback 7 is opened, i.e. swivelled upwards into the upper position shown in FIG. 1 by dashed lines, the piston rod 4 extends out of the housing 2 because of the pushing force exerted on the piston rod 4 by the gas pressure in the housing 2, and pushes the hatchback 7 upwardly. This is known and generally customary.

As shown in FIGS. 2 and 3, a guide sleeve 11 is attached on the end of the housing 2 where the piston rod exits, which coaxially guides the piston rod 4, and which is supported axially towards the outside by a flange 12 of the housing 2. A seal 13 adjoins this guide sleeve 11 and sealingly adjoins on the one side the inner wall 14 of the housing 2 and sealingly adjoins on the other side the piston rod 4, such that the gas spring 1 is closed gas-tight at its end where the piston rod exits.

In the inner chamber 15 of the housing 2, a support ring 16 follows the seal 13 and is axially supported by means of a bead 18 rolled into the housing 2 and engaging a corresponding peripheral groove 17 of the supporting ring 16.

A so-called damping piston 19 is attached to the end of the piston rod 4 contained in the housing 2, which has an annular chamber 20 open towards the inner wall 14 of the housing 2, in which a damping ring 21 adjoining the inner wall 14 is provided. The annular chamber 20 has two axial limiting surfaces serving as stop faces 22, 23, their distance being a little larger than the axial extension of the damping ring 21, so that the latter can move axially to a small degree between them in relation to the piston 19.

A free space 24 is formed radially inside the damping ring 21 and a flow-through conduit 25 ends in it. On its other end the flow-through conduit 25 ends in the partial inner chamber 15' located between the damping piston 19 and the end of the gas spring where the piston rod exits.

In the stop face 23 located axially opposite the flow-through conduit 25, a generally radially extending flow-through conduit 26 is provided, ending in an annular slit 27 between the piston 19 and the inner wall 14 of the housing 2. Via this the annular chamber 20 in the piston 19 can be connected with the partial inner chamber 15''' formed between the piston 19 and the closed end of the housing 2 of the gas spring 1. The radial extend of the flow-through conduit 26 is larger than that of the damping ring 21, so that this flow-through conduit also ends in the free space 24. The cross section of the annular slit 27 is considerably larger than that of the flow-through conduit 26, so that when the damping ring 21 abuts against the stop face 23, which occurs when the piston rod 4 is being extended out of the housing 2, gas and/or fluid can flow from the partial inner chamber 15' through the flow-through conduit 25, the free space 24, the flow-through conduit 26 and the annular slit 27 into the partial inner chamber 15'''. A strong damping then takes place in the flow-through conduit 26, i.e. the extension movement of the piston rod 4 from the housing 2, is strongly damped. However, if the damping ring 21 abuts against the stop face 22, which is the case when the piston rod 4 is pushed or retracted into the housing 2, the gas and/or the damping fluid can flow across the full cross-section of the annular slit 27 into the free space 24, and from there also unthrottled through the flow-through conduit 25 into the partial inner chamber 15'. The retracting movement of the piston rod therefore is undamped to a large degre. It only takes place against the force exerted on the piston rod 4 by the pressure gas contained in the inner chamber 15 of the housing 2. In addition to filling with pressurized gas, an amount of a liquid only partially filling the inner chamber 15 can be provided, which can be either simply a lubricating oil in the amount of several cubic centimeters or a damping fluid. Pressurized gas and/or damping fluid are all considered herein as appropriate fluids.

An auxiliary piston 28 is provided to be axially slideable on the piston rod 4. It is supported via a helical spring 29 against the support ring 16. The auxiliary piston 28 has, to achieve tilt-free guidance on the piston rod 4, i.e. to achieve a sufficient length of bearing, a guide sleeve 30 located inside the helical spring 29. The guide sleeve 30 is somewhat shorter than the helical spring 29 when fully compressed, so that the guide sleeve 30 and with it the auxiliary piston 28 cannot impact on the support ring 16.

The auxiliary piston 28 has an annular groove 31 in the area oriented towards the damping piston 19, which is axially limited by two stop faces 32, 33. A piston ring 34 is disposed in the annular groove 31 which tightly abuts against the inner wall 14 of the housing 2 and the axial extension of which is smaller than the axial distance of the stop faces 32, 33, so that it can move relative to the auxiliary piston 28. A free space 35 is provided in the annular groove 31 radially within the piston ring 34.

Adjacent to the stop faces 32, 33, annular slits 36, 37 are provided between the inner wall 14 of the housing 2 and the auxiliary piston 28. In the stop face 32 adjoining the end of the gas spring 1 where the piston rod exits, at least one flow-through conduit 38 radially bridging the piston ring 34 is formed, connecting the neighboring annular slit 36 with the free space 35. If the auxiliary piston 28 is pushed in the direction towards the end of the housing 2 where the piston rod exits, the piston ring 34 tightly abuts against the stop face 33 adjoining the damping piston 19, and thereby completely closes the associated annular slit 37 so that in this way no fluid can flow from the partial inner chamber 15''' between the auxiliary piston 28 and the support ring 16 into the partial inner chamber 15' between the piston 19 and the auxiliary piston 28. If, however, the auxiliary piston 28 is moved into the housing 2 of the gas spring 1 or is put under load, the piston ring 34 abuts against the other stop face 32, so that fluid can flow through the annular slit 37, the free space 35, the at least one radial flow-through conduit 38 and the annular slit 36 out of the partial inner chamber 15' into the partial inner chamber 15'''.

The auxiliary piston 28 with the guide sleeve 30 is guided on the piston rod with a small amount of radial play, i.e. between the auxiliary piston 28 and the piston rod 4 extends an annular-cylindrical throttle duct 39. During movements of the auxiliary piston 28 in the direction of the end of the housing 2 where the piston rod exits, when the auxiliary piston 28 is completely closed by the piston ring 34 in the manner described above, fluid can flow from the partial inner chamber 15''' into the partial inner chamber 15' with corresponding throttling, i.e. damping of the extension movement of the piston rod.

The mode of operation is as follows. If, for opening the hatch 8, the piston rod 4 is pushed out of the housing 2 under the pressure of the gas in the latter, the fluid, in this case primarily pressurized gas, flows in the already described manner through the damping piston 19, namely from the partial inner chamber 15' into the partial inner chamber 15". This extension movement is throttled, i.e. damped. Before the damping piston 19 reaches the auxiliary piston 28 the latter has no effect. Shortly before the end of the extension movement of the piston rod 4, the piston 19 meets the auxiliary piston 28 and pushes it in the direction of the end of the housing 2 where the piston rod exits, which causes the closing of the auxiliary piston 28 by the piston ring 34. Now a force is exerted on the auxiliary piston 28 and thereby on the damping piston 19, and in turn on the piston rod 4, by the helical spring 29 which opposed the extension force exerted by the pressure of the gas on the piston rod 4. This opposing force increases as the piston rod 4 is extended from the housing 2, i.e., the more the helical spring 29 is compressed. Additionally, a considerable damping force is exerted on the auxiliary piston 28 and thereby on the piston rod 4, because the fluid can only flow from the partial inner chamber 15''' through the throttle duct 39 into the partial inner chamber 15', and from there through the damping piston 19 into the partial inner chamber 15". When the piston rod 4 is extended, a pronounced end position damping is achieved by the auxiliary piston 28 with the helical spring 29.

The auxiliary piston 28 has on the side oriented towards the damping piston 19 a funnel opening 40, which assures, when the auxiliary piston 28 and the damping piston 19 are brought together, that the throttle duct 39 remains connected with the flow-through conduit 25 of the damping piston. The funnel opening 40 and the flow-through conduit 25 therefore at least partially overlap. This step is necessary since the partial inner chamber 15' disappears to a large degree or completely when the damping piston 19 abuts against the auxiliary piston 28.

When the piston rod 4 is retracted, i.e. when the hatchback 8 is closed, the auxiliary piston 28 is relieved and moves, under the pressure of the pre-stressed spring 29, again in the direction towards the closed end of the housing 2, so that the piston ring 34 no longer closes the auxiliary piston 28, as already described.

As can be seen from the above description, the gas spring according to the invention is primarily usable when the piston rod is, during all operational conditions, downwardly inclined, viewed from the direction of the piston 19, towards its free end, i.e. towards the hinge 8, so that the auxiliary piston 28 always adjoins the spring 29 under its own weight. This is also recommended when not only pressurized gas but also damping fluid is used, i.e. when damping of the movement of the auxiliary piston 28 in the form of end position damping is achieved by means of a damping fluid. In any case, the employment of the gas spring should be such that the free end of the piston rod, i.e. the hinge 8, is only above the piston 19 at a time when the piston rod 4 has been extended from the housing 2 to the extent that the piston 19 already abuts against the auxiliary piston 28.

The end position damping can also be provided in two stages, namely if the partial inner chamber 15''' is only partially filled with damping fluid. In this case a first phase of the end position damping occurs after impact of the piston 19 on the auxiliary piston 28, against only the increasing force of the spring. Additional damping then only takes place after the auxiliary piston 28 has been moved so far, towards the end of the housing 2 where the piston rod exits, that the partial inner chamber 15''' is completely filled with oil and the oil is forced out through the throttle duct 39. This two-stage end position damping is only possible if the gas spring is arranged, in every operational position, so that the protruding end of the piston rod 4 is downwardly inclined, namely so that the fluid always remains in the partial inner chamber 15''' when the auxiliary piston 28 takes up a position corresponding to the relieved spring 29. In the same manner the damping fluid can also still be in the partial inner chamber 15'. Until the damping piston 19 contacts this fluid, only gas with less damping flows through the piston 19. The first step of the damping then takes place at the piston 19.

The maximum travel A of the auxiliary piston 28 determines the length of the extension movement of the piston rod 4 via which the end position damping takes place.

The spring characteristics of the helical spring 29 determine the counter-force exerted by it, and thereby the damping force exerted by it. The design of the throttle duct 39 determines the additional hydraulic and/or pneumatic damping by the auxiliary piston 28.

It is to be understood that the above description is only given by way of example, and that other variations and improvements are possible within the scope of the invention.

What is claimed is:

1. A gas spring with end position damping, comprising
   a housing, filled with a fluid under pressure and at least partially filled with a gas under pressure,
   a piston rod sealingly extending from one end of the housing and being coaxially slidingly disposed therein,
   a damping piston fastened on the inner end of said piston rod, and
   a device for damping an extension movement of the piston rod at the end of its extension provided at the end of said housing where the piston rod exits,
   said device for the damping of the extension movement of the piston rod including
   an independent auxiliary piston, slideably disposed on and guided on said piston rod and formed as a throttle piston and having at least one permanently open throttle duct, and said throttle duct being formed between the piston rod and the auxiliary piston, and
   an energy accumulator supported against the end of said housing where the piston rod exits,
   wherein, near the end of said extension movement of the piston rod, the latter pushes the auxiliary piston against the force of the energy accumulator under simultaneous decrease of a partial inner chamber between the auxiliary piston and said end of the housing where the piston rods exits, and a throttle effect of the auxiliary piston during extension is larger than during retraction of the piston rod into the housing, the throttle effect of the auxiliary piston being independent of a damping effect of the damping piston.

2. A gas spring in accordance with claim 1, wherein the auxiliary piston has at least on flow-through conduit, which is closed during said extension of the piston rod, and open during retraction thereof, by means which are integral with said auxiliary piston.

3. A gas spring in accordance with claim 2, wherein at the outer circumference of the auxiliary piston an annular groove with a piston ring tightly abutting the inner wall of the housing is formed, which closes a flow-through conduit during a movement of the auxiliary piston in the direction of the end of the housing where the piston rod exits.

4. A gas spring in accordance with claim 1, further comprising a guide sleeve for achieving tilt-free guidance of said auxiliary piston on said piston rod.

5. A gas spring in accordance with claim 4, wherein said energy accumulator comprises a helical spring and said guide sleeve is disposed inside said helical spring and is shorter than said helical spring when fully compressed.

6. A gas spring in accordance with claim 4, wherein said throttle duct is formed in an annular-cylindrical way by a radial play between said auxiliary piston with said guide sleeve and said piston rod.

7. A gas spring in accordance with claim 1, wherein said damping piston comprises a flow-through conduit and said auxiliary piston comprises a funnel opening on the side oriented towards said damping piston, wherein said conduit and said opening overlap at least partially, whereby the throttle duct remains connected with the flow-through conduit of said damping piston when said auxiliary piston and said damping piston are brought together.

8. A gas spring with plural damping phases, comprising
a piston rod disposed axially in a cylindrical housing having a first closed end and a second end through which said piston rod sealingly extends out from said housing and retracts thereinto, said housing containing at least one fluid and at least partially filled with a gas under pressure,
a damping piston disposed on the end of said piston rod in said housing,
an independent auxiliary piston provided about and guided on said piston rod between said damping piston and said second end of said housing, said auxiliary piston including damping means for allowing said at least one fluid to pass with substantially more damping when said auxiliary piston is moved towards said second end of said housing than when moved towards said first end thereof, said auxiliary piston comprising at least one permanently open throttle duct and said throttle duct being formed between the piston rod and the auxiliary piston,
said damping means including energy accumulator means, and further providing that when said piston rod is extended a predetermined amount, further extension of the piston rod in the direction of said second end results in increased damping including by said energy accumulator means, and wherein a throttle effect of the auxiliary piston is independent of the damping effect of the damping piston.

9. The spring of claim 8, oriented so that said first end of the housing is always above said second end thereof.

10. The spring of claim 9, comprising two types of said fluid in said housing, namely a first of said fluids being a pressurized gas and the second being a liquid.

11. The spring of claim 10, wherein said at least one fluid is pressurized to cause said piston rod to extend toward said second end of said housing.

12. An automobile with a rear body and a hatchback hinged at a top part of said rear body thereto, wherein said first end of said spring of claim 9 is attached to said hatchback and a far end of said piston rod is attached to said rear body at a position below where said first end is attached to said hatchback, said hatchback being lifted upward with said extension of said piston rod.

13. The spring of claim 8, disposed so that said auxiliary piston falls under its own weight to contact said energy accumulator means, during at least a part of the operation thereof.

14. The spring of claim 8, oriented so that said second end of the housing is above said first end thereof only when said piston rod has been extended sufficiently for said damping piston to contact said auxiliary piston.

15. An automobile with a rear body and a hatchback hinged at a top part of said rear body, wherein said first end of said spring of claim 8 is attached to said hatchback and a far end of said piston rod is attached to said rear body at a position below where said first end is attached to said hatchback, said hatchback being lifted upward with said extension of said piston rod.

16. The spring of claim 8, wherein said at least one fluid is pressurized to cause said piston rod to extend toward said second end of said housing.

17. The spring of claim 8, said auxiliary piston comprising a one-way throttle and a two-way throttle, and said damping piston comprising a two-way throttle, said two-way throttle of said auxiliary piston having equal damping for said extension and retraction of said piston rod, except as dependent on different types of said fluid being present therein, and said two-way throttle of said damping piston providing different damping for said extension and retraction for the same type of said fluid being present therein

* * * * *